United States Patent
Ichikawa et al.

(10) Patent No.: US 8,570,682 B2
(45) Date of Patent: Oct. 29, 2013

(54) DISK DRIVE USING AN AIRFLOW REDUCTION PLATE AND METHODS OF MANUFACTURING THEREOF

(75) Inventors: Kazuhide Ichikawa, Kanagawa (JP); Takashi Kouno, Kanagawa (JP); Kouki Uefune, Kanagawa (JP); Takako Hayakawa, Kanagawa (JP)

(73) Assignee: HGST Netherlands, B.V., Amsterdam (NL)

( * ) Notice: Subject to any disclaimer, the term of this patent is extended or adjusted under 35 U.S.C. 154(b) by 711 days.

(21) Appl. No.: 12/642,332

(22) Filed: Dec. 18, 2009

(65) Prior Publication Data

US 2010/0157469 A1 Jun. 24, 2010

(30) Foreign Application Priority Data

Dec. 19, 2008 (JP) .................................. 2008-323475

(51) Int. Cl.
*G11B 33/14* (2006.01)
(52) U.S. Cl.
USPC ................... 360/97.12; 360/97.13; 360/97.14; 360/97.15
(58) Field of Classification Search
USPC ................... 360/97.02, 97.12–97.15
See application file for complete search history.

(56) References Cited

U.S. PATENT DOCUMENTS

| | | | |
|---|---|---|---|
| 7,397,631 B1 * | 7/2008 | Suwito et al. | 360/97.13 |
| 7,787,213 B1 * | 8/2010 | Michael et al. | 360/97.13 |
| 2005/0270691 A1 * | 12/2005 | Pottebaum et al. | 360/97.02 |
| 2006/0066993 A1 * | 3/2006 | Agematsu et al. | 360/97.03 |
| 2008/0151420 A1 * | 6/2008 | Lee et al. | 360/97.02 |

FOREIGN PATENT DOCUMENTS

JP 2008/152891 7/2008

* cited by examiner

*Primary Examiner* — Will J Klimowicz
*Assistant Examiner* — Carlos E Garcia
(74) *Attorney, Agent, or Firm* — Zilka-Kotab, PC

(57) ABSTRACT

In order to effectively reduce disk flutter in a disk drive by using simple structures and efficient manufacturing techniques, a disk drive, in one embodiment, includes a base, a spindle motor coupled to the bottom of the base, a disk coupled to and rotated by a rotational shaft of the spindle motor, an airflow reduction plate coupled inside the base and positioned opposite to and away from a main plane of the disk, and a sidewall section inside the base which is positioned opposite to an outer edge of the disk and has a form along the outer edge of the disk. A first gap between at least one half of a part positioned opposite to the sidewall section in an outer edge of the airflow reduction plate and the sidewall section is smaller than a second gap between the sidewall section and the outer edge of the disk.

14 Claims, 10 Drawing Sheets

(a)

(b)

(a)

(b)

DISK DRIVE USING AN AIRFLOW REDUCTION PLATE AND METHODS OF MANUFACTURING THEREOF

RELATED APPLICATIONS

The present application claims priority to a Japanese Patent Application filed Dec. 19, 2008, under Appl. No. 2008-323475, which is incorporated herein by reference.

FIELD OF THE INVENTION

The present invention relates to magnetic recording/reproducing, and more particularly, to magnetic recording using a disk drive device having an airflow reduction plate for improving accuracy in head positioning by blocking airflow.

BACKGROUND OF THE INVENTION

Data storage devices using various kinds of media, such as optical disks and magnetic tapes, have been known in the art. In particular, hard disk drives (HDDs) have been widely used as storage devices for computers and have been one of the indispensable devices used in current computer systems. Moreover, the HDDs have found widespread application in motion picture recording/reproducing apparatuses, car navigation systems, cellular phones, mobile media players, digital video recorders, etc., in addition to computers, because of their outstanding performance characteristics.

Magnetic disks used in current HDDs have multiple concentric data tracks and servo tracks provided discretely in the disk circumferential direction. User data are recorded in units of data sectors and a data sector is recorded between servo sectors. A swing actuator moves a head slider above a spinning magnetic disk. A head element portion of a head slider accesses a desired data sector in accordance with position information indicated by servo data to write data to the data sector or to read data from the data sector.

The head element portion is fixed to a slider to constitute a head slider. The head slider is secured to a swing actuator. The slider flies above a spinning magnetic disk and the actuator positions the head slider (head element portion) to a desired radial position on the magnetic disk. In reading data, the signal read from the magnetic disk by the head element portion undergoes predetermined signal processing such as waveform shaping and decoding with a signal processing circuit and then is transmitted to a host. The transfer data from the host undergo predetermined processes by the signal processing circuit and then are written to the magnetic disk.

In a HDD, airflow generated by the spin of a magnetic disk creates numerous problems. For example, the airflow may cause the actuator to sway, which disturbs accurate positioning of the head. In addition, vibrations of the magnetic disk (disk flutter) caused by the turbulence of the airflow generated by the magnetic disk's spin causes writing and reading errors. The disk flutter disturbs accurate positioning of the head to a track as well as the head's sway. Such vibrations caused by airflow are called flow induced vibration (Fly).

For HDDs, suppression of the FIV has been consistently used to increase head positioning accuracy. In particular, as recording density in a magnetic disk increases to attain higher tracks per inch (TPI) in order to store more information on a smaller area, more accurate head positioning is required. Therefore, even small disk flutters are becoming problematic in advanced HDDs having higher TPI's.

To improve the FIV characteristic in a HDD, a disk damper plate, which is a plate facing a disk mounted in the HDD, has been considered as a way to lessen FIV. For example, Japanese Unexamined Patent Application Pub. No. 2008-152891 proposes a HDD in which an airflow guide plate (according to the term used in the reference) is provided upstream of the actuator. The airflow guide plate is mounted by being inserted in a groove in a shroud formed on a sidewall section of the base.

A disk damper plate weakens airflow above a magnetic disk toward the actuator in order to reduce turbulence vibrations of a magnetic head. In addition, the disk damper plate weakens the airflow above the magnetic disk to suppress disk flutter. The effect of a disk damper plate to suppress disk flutter depends on the reduction in the amount and the speed of the airflow.

Spin of a magnetic disk generates airflow above the main plane (the plane vertical to the rotational axis) of the disk. If a disk damper plate is inserted between magnetic disks or between a magnetic disk and the top cover, the volume of the space decreases, so the amount of flow decreases. With respect to the cross-section in a direction of the rotational axis, the disk damper plate blocks the airflow, so the speed of the airflow decreases.

In this way, the disk flutter suppression effect of the disk damper plate is attained by restricting the airflow parallel to the main plane of the magnetic disk. However, the airflow caused by the spin of the magnetic disk is not only the airflow parallel to the main plane of the magnetic disk. There exists airflow caused by disk spin in the direction vertical to the main plane of the magnetic disk, too. There is a gap between the magnetic disk and the inside sidewall of the base. The air flows upward or downward in the gap.

Disk flutter includes vibrations of a magnetic disk parallel to the rotational axis, and is caused by the air flowing between the outer edge of the magnetic disk and the inside sidewall of the base. Accordingly, it is desirable to restrict the airflow vertical to the main plane of the magnetic disk in addition to the airflow parallel to the main plane of the magnetic disk.

In the HDD disclosed in Japanese Unexamined Patent Application Pub. No. 2008-152891, the airflow guide plate is inserted in a groove of a shroud formed on the sidewall of the base. Thus, the path between the magnetic disk and its base mount is blocked by the airflow guide plate, so an effect is expected that restricts airflow upward or downward on the outer edge of the magnetic disk.

However, shaping a shroud groove on the inside sidewall of the base requires time and effort, which is not preferable for the manufacturing efficiency and costs of HDDs. Further, a manufacturing step of inserting the airflow guide plate into the shroud groove is required, which degrades the manufacturing efficiency of the HDDs. In addition, as indicated in Japanese Unexamined Patent Application Pub. No. 2008-152891, friction in inserting the airflow guide plate into the shroud groove may produce dusts and/or debris. Accordingly, a technique that restricts air flowing upward or downward between the outer edge of the magnetic disk and the inside sidewall of the base, which also alleviates the inefficiencies associated with current techniques, is desirable.

SUMMARY OF THE INVENTION

In one embodiment, a disk drive includes a base; a spindle motor coupled to the bottom of the base; a disk coupled to and rotated by a rotational shaft of the spindle motor; an airflow reduction plate coupled inside the base and positioned opposite to and away from a main plane of the disk; and a sidewall section inside the base which is positioned opposite to an outer edge of the disk and has a form along the outer edge of the disk. A first gap between at least one half of a part positioned opposite to the sidewall section in an outer edge of the airflow reduction plate and the sidewall section is smaller than a second gap between the sidewall section and the outer edge of the disk.

In another embodiment, a disk drive includes a base; a spindle motor coupled to a bottom of the base; a disk coupled to and rotated by a rotational shaft of the spindle motor; an airflow reduction plate which is coupled to an inside of the base and positioned opposite to and away from a main plane of the disk; a sidewall section inside the base which is opposite to an outer edge of the disk and has a form along the outer edge; and a mechanism for pressing an outer edge of the airflow reduction plate against the sidewall section.

According to another embodiment, a method for manufacturing a disk drive includes preparing a base having a spindle motor coupled to a bottom thereof; placing a disk on a shaft of the spindle motor; arranging a sidewall section inside the base having a form along an outer edge of the disk so as to be opposite to the outer edge of the disk; placing an airflow reduction plate having a part and a tab on an outer edge of the airflow reduction plate inside the base so that the part is located opposite to a main plane of the disk and the tab is located beyond an outer dimension of the sidewall section; inserting a screw into a hole in the tab in a direction normal to a main plane of the airflow reduction plate from the disk toward the spindle motor; and flattening out a component interposed between the screw and the hole in the tab to push the tab outward for moving the outer edge of the airflow reduction plate toward the sidewall section by tightening the screw fastened to a screw hole in the base.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

Figure 1:
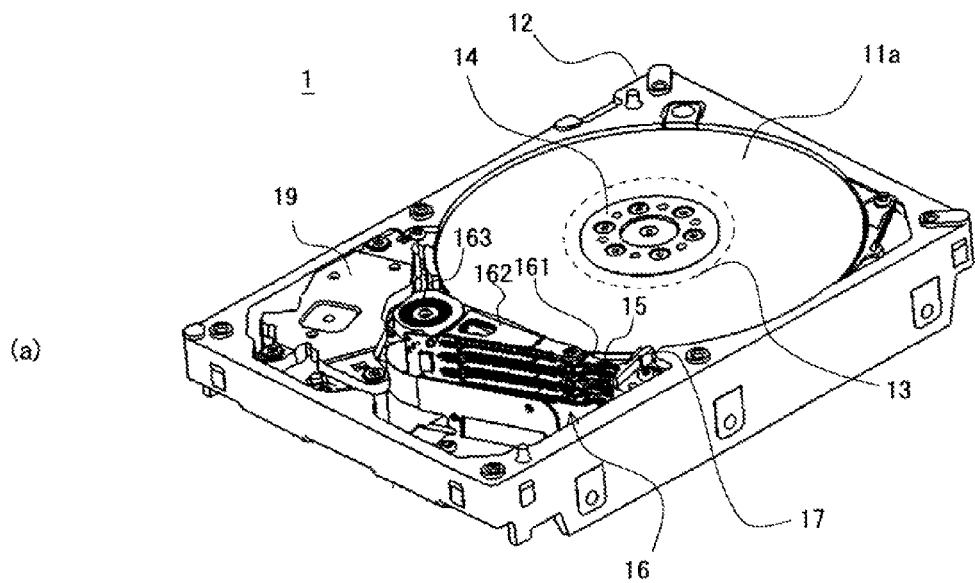
FIGS. 1(a)-1(b) are exemplary top views schematically depicting the entire structure of a HDD according to some approaches.
Figure 1:
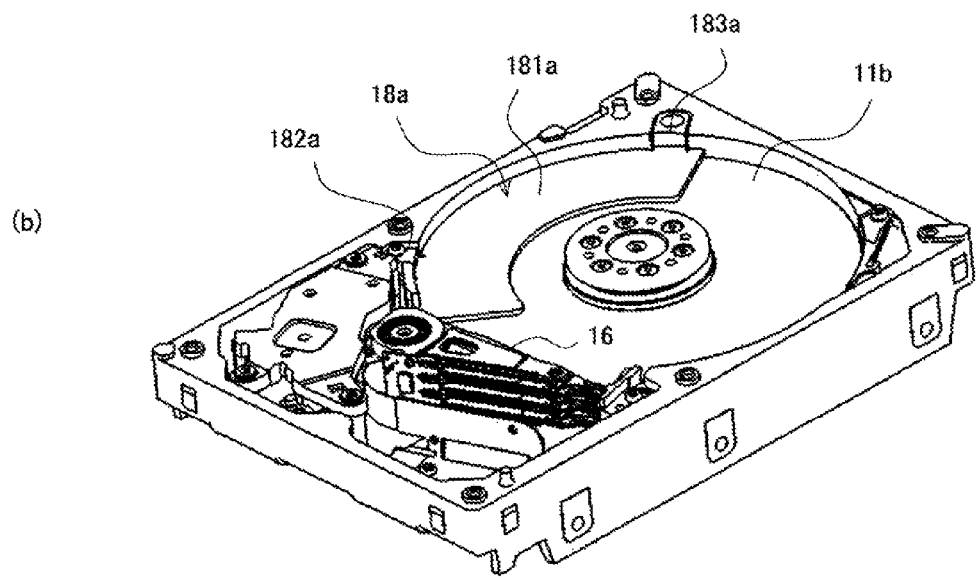

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to one general embodiment, a disk drive includes a base, a spindle motor coupled to the bottom of the base, a disk coupled to and rotated by a rotational shaft of the spindle motor, an airflow reduction plate coupled inside the base and positioned opposite to and away from a main plane of the disk, and a sidewall section inside the base which is positioned opposite to an outer edge of the disk and has a form along the outer edge of the disk. A first gap between at least one half of a part positioned opposite to the sidewall section in an outer edge of the airflow reduction plate and the sidewall section is smaller than a second gap between the sidewall section and the outer edge of the disk.

In another embodiment, a disk drive includes a base, a spindle motor coupled to a bottom of the base, a disk coupled to and rotated by a rotational shaft of the spindle motor, an airflow reduction plate which is coupled to an inside of the base and positioned opposite to and away from a main plane of the disk, a sidewall section inside the base which is opposite to an outer edge of the disk and has a form along the outer edge, and a mechanism for pressing an outer edge of the airflow reduction plate against the sidewall section.

According to another embodiment, a method for manufacturing a disk drive includes preparing a base having a spindle motor coupled to a bottom thereof, placing a disk on a shaft of the spindle motor, arranging a sidewall section inside the base having a form along an outer edge of the disk so as to be opposite to the outer edge of the disk, placing an airflow reduction plate having a part and a tab on an outer edge of the airflow reduction plate inside the base so that the part is located opposite to a main plane of the disk and the tab is located beyond an outer dimension of the sidewall section, inserting a screw into a hole in the tab in a direction normal to a main plane of the airflow reduction plate from the disk toward the spindle motor, and flattening out a component interposed between the screw and the hole in the tab to push the tab outward for moving the outer edge of the airflow reduction plate toward the sidewall section by tightening the screw fastened to a screw hole in the base.

In one approach, a disk drive comprises a base, a spindle motor coupled to the bottom of the base, a disk coupled to and rotated by a rotational shaft of the spindle motor, an airflow reduction plate which is secured inside the base and disposed opposite to and distant from the main plane of the disk, and a sidewall section inside the base which is opposite to the outer edge of the disk and has a form along the outer edge. A gap between at least a half of the part disposed opposite to the sidewall section in the outer edge of the airflow reduction plate and the sidewall section is smaller than the gap between the sidewall section and the outer edge of the disk. This accomplishes effective reduction of disk flutter in a disk drive.

It is preferable, in some approaches, that at least a portion of the part disposed opposite to the sidewall section in the outer edge of the airflow reduction plate be in contact with the sidewall section. This accomplishes more effective reduction of disk flutter in a disk drive. Furthermore, it is preferable that the disk drive further comprises a mechanism for pressing the part disposed opposite to the sidewall section of the airflow reduction plate against the sidewall section, in some embodiments. Thereby, the outer edge of the airflow reduction plate may be in contact with the sidewall section more easily and more closely.

It is preferable, in some approaches, that the disk drive further comprises a mechanism for pushing the airflow reduction plate toward the sidewall section. Thereby, the gap may be adjusted easily and accurately. More preferably, the disk drive may further comprise a screw penetrating a hole in a tab formed on the outer edge of the airflow reduction plate in a direction normal to the main plane and fastened to a screw hole located outside the sidewall section inside the base, and the mechanism includes an elastic component which pushes the tab between the screw and the hole in the tab to press the airflow reduction plate against the sidewall section. Thereby, the gap may be adjusted accurately in a simple structure. Moreover, the elastic component may be elastically deformed by being flattened out in the normal direction by the screw pushing the tab. Thereby, in manufacture of a disk drive, the gap may be adjusted efficiently.

Preferably, in some embodiments, the disk drive further comprises a first screw penetrating a hole in a first tab formed on the outer edge of the airflow reduction plate in a direction normal to the main plane, and inserted in and fastened to a first screw hole located outside the sidewall section inside the base in a direction from the disk toward the spindle motor, and a second screw being a right-hand screw which penetrates a hole in a second tab formed on the right side of the first tab when viewed from the rotational shaft of the spindle motor on the outer edge of the airflow reduction plate in a direction normal to the main plane, and is inserted in and fastened to a second screw hole located outside the sidewall section inside the base in a direction from the disk toward the spindle motor; and the mechanism is provided only between the second screw and the hole in the second tab of the first screw and the second screw, and includes an elastic component which pushes the second tab by being flattened out in the normal direction by the second screw to press the airflow reduction plate against the sidewall section. Thereby, the number of components may be reduced.

Preferably, the disk drive further comprises a first screw being a left-hand screw which penetrates a hole in a first tab formed on the outer edge of the airflow reduction plate in a direction normal to the main plane, and is inserted in and fastened to a first screw hole located outside the sidewall section inside the base in a direction from the disk toward the spindle motor, and a second screw penetrating a hole in a second tab formed on the right side of the first tab when viewed from the rotational shaft of the spindle motor on the outer edge of the airflow reduction plate in a direction normal to the main plane, and inserted in and fastened to a second screw hole located outside the sidewall section inside the base in a direction from the disk toward the spindle motor, in some approaches. The mechanism is provided only between the first screw and the hole in the first tab of the first screw and the second screw, and includes an elastic component which pushes the first tab by being flattened out in the normal direction by the first screw to press the airflow reduction plate against the sidewall section. Thereby, the number of components may be reduced.

It is preferable, in some embodiments, that the gap of the entire part having a form along the sidewall section in the outer edge of the airflow reduction plate be smaller than the gap between the sidewall section and the outer edge of the disk. This accomplishes more effective reduction of disk flutter in a disk drive.

A disk drive, according to another embodiment, comprises a base, a spindle motor fixed to the bottom of the base, a disk fixed to and rotated by a rotational shall of the spindle motor, an airflow reduction plate which is secured inside the base and disposed opposite to and distant from the main plane of the disk, a sidewall section inside the base which is opposite to the outer edge of the disk and has a form along the outer edge, and a mechanism for pressing the outer edge of the airflow reduction plate against the sidewall section. Thereby, the outer edge of the airflow reduction plate may be get into contact with the sidewall section closely and to reduce disk flutter in the disk drive effectively.

Preferably, in some approaches, the disk drive further comprises a first screw penetrating a hole in a first tab formed on the outer edge of the airflow reduction plate in a direction normal to the main plane, and inserted in and fastened to a first screw hole located outside the sidewall section inside the base in a direction from the disk toward the spindle motor, and a second screw penetrating a hole in a second tab formed on the outer edge of the airflow reduction plate in a direction normal to the main plane, and inserted in and fastened to a second screw hole located outside the sidewall section inside the base in a direction from the disk toward the spindle motor; and a rightward or leftward rotational direction for tightening the second screw agree with the right or left location of the second screw with respect to the first screw when viewed from the rotational shaft of the spindle motor, and the mechanism pushes the second tab by being flattened out in the normal direction by the second screw to press the airflow reduction plate against the sidewall section. Thereby, the outer edge of the airflow reduction plate may be get into contact with the sidewall section closely, while the number of components may be reduced.

Yet another approach includes a method of manufacturing a disk drive. The method includes preparing a base having a spindle motor fixed on the bottom thereof. A disk is placed on a shaft of the spindle motor and arranges a sidewall section inside the base having a form along the outer edge of the disk so as to be opposite to the outer edge of the disk. An airflow reduction plate having a plate part and a tab on the outer edge of the plate is placed inside the base so that the plate part is located opposite to the main plane of the disk and the tab is located outside the sidewall section. A screw is inserted in a direction normal to the main plane into a hole in the tab in a direction from the disk toward the spindle motor. A component interposed between the screw and the hole in the tab is flattened to push the tab outward for shifting the outer edge of the airflow reduction plate toward the sidewall section in tightening the screw to be fastened to a screw hole in the base. Thereby, the distance between the outer edge of the airflow reduction plate and the sidewall section may be reduced easily and reliably.

Preferably, in some approaches, the method includes flattening out the component via tightening the screw to be fastened to a screw hole in the base to push the tab outward for pressing the outer edge of the airflow control plate against the sidewall section. Thereby, the outer edge of the airflow reduction plate may be shifted toward the sidewall section easily and efficiently.

Preferably, according to some embodiments, the airflow reduction plate includes a first tab and a second tab on the outer edge of the plate part, and the second tab is located on the right side when viewed from the rotational axis of the spindle motor; and the method flattens out a component interposed between a second screw being a right-hand screw and a hole in the second tab to push the second tab outward for shifting the outer edge of the airflow reduction plate toward the sidewall section, in tightening the second screw which is inserted in the hole in the second tab in the direction from the disk toward the spindle motor, to be fastened to a screw hole in the base; and tightens a first screw which has been inserted in a hole in the first tab in a direction from the disk toward the spindle motor, to be fastened to a screw hole inside the base, after tightening the second screw. Thereby, the distance between the outer edge of the airflow reduction plate and the sidewall section may be reduced more reliably.

Preferably, in some approaches, the airflow reduction plate includes a first tab and a second tab on the outer edge of the plate part, and the first tab is located on the left side when viewed from the rotational axis of the spindle motor; and the method flattens out a component interposed between a first screw being a left-hand screw and a hole in the first tab to push the first tab outward for shifting the outer edge of the airflow reduction plate toward the sidewall section, in tightening the first screw which is inserted in the hole in the first tab in the direction from the disk toward the spindle motor, to be fastened to a screw hole in the base; and tightens a second screw which has been inserted in a hole in the second tab in a direction from the disk toward the spindle motor, to be fastened to a screw hole in the base, after tightening the first screw. Thereby, the distance between the outer edge of the airflow reduction plate and the sidewall section may be reduced more reliably.

According to some embodiments, disk flutter in a disk drive may be reduced more effectively in a simple structure and through efficient manufacturing techniques.

Hereinafter, preferred embodiments are described in relation to the various figures. For clarity of explanation, the following descriptions and the accompanying figures may include omissions and simplifications as appropriate. Throughout the drawings, like components are denoted by like reference numerals, and repetitive descriptions are omitted for clarity of explanation if not necessary. Hereinafter, a hard disk drive (HDD) will be used as an example of a disk drive, but any other type of disk drive may be used in conjunction with the embodiments and descriptions presented herein.

Figure 5:
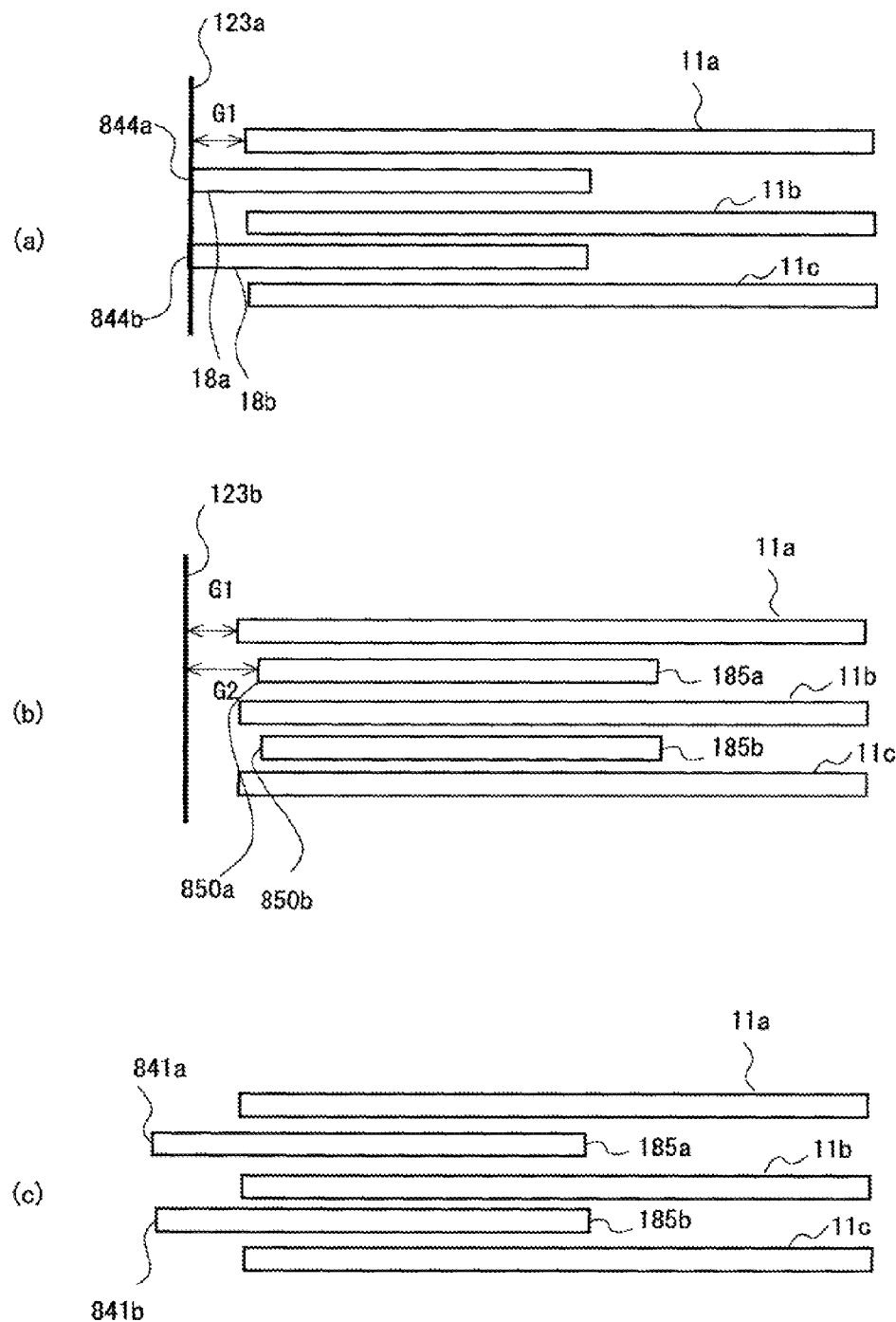
FIGS. 5(a)-5(c) are cross-sectional views sectioned along the lines in FIG. 4, according to several embodiments.

A disk drive, according to one embodiment, includes a disk damper plate, which is an airflow restriction plate for restricting airflow generated by the spin of a magnetic disk. FIG. 1(a) is a perspective view schematically depicting the structure of a HDD 1, according to one embodiment. In FIG. 1, a base 12 for housing components of the HDD 1 is secured with a top cover (not shown) for covering the top opening of the base via a gasket to constitute a disk enclosure. A magnetic disk 11a is mounted on a hub of a spindle motor (SPM) 13 and sandwiched between a screw-cramped top clamp 14 and the hub to be secured to the spindle motor 13. In one embodiment, the HDD 1 has three magnetic disks 11a to 11c (refer to FIG. 5), and FIG. 1(a) shows the uppermost magnetic disk 11a.

Descriptions provided herein are particularly suitable for a HDD having a plurality of magnetic disks, but are applicable to a HDD having a single magnetic disk also. In the description of the components within the HDD 1 in the following embodiments, the side closer to the spindle center is defined as an inner side and the side away therefrom is defined as an outer side, like in the magnetic disks 11a to 11c. Further, in the following embodiments, the direction toward the top cover is defined as an upside and the direction toward the bottom of the base 12 is a downside.

The spindle motor 13 is fixed to the bottom of the base 12 and rotates the three magnetic disks 11a to 11c fixed to the spindle shaft at a specific speed. In FIG. 1(a), the magnetic disks 11a to 11c spin counterclockwise. An actuator 16 holds head sliders 15 at the tip thereof. A head slider 15 comprises a slider and a head element portion as a transducer element bonded to the slider surface. The head element portion writes and/or reads data to/from the magnetic disk 11.

The actuator 16 comprises components of suspensions 161, arms 162, and a flat coil (not shown), which are connected in this order from its tip where the heads are disposed. A voice coil motor (VCM) 19 pivots the actuator 16 in its lateral direction (the disk radial direction) on a pivot shaft 163 by the driving current fed across the flat coil in accordance with a control signal from a controller (not shown). Thereby, the actuator 16 moves the head sliders 15 above the magnetic disks 11a to 11c along a radial direction of the disk surfaces or to the outside of the magnetic disks 11a to 11c. Thereby, a head slider 15 may access (read or write) a desired track.

The pressure between the flying surface of each slider facing the associated recording surface (main plane) of the magnetic disks 11a to 11c and the associated spinning magnetic disk balances the force applied by each suspension 161 toward the associated magnetic disk so that each head slider 15 may fly above the associated magnetic disk. When the magnetic disk assembly (e.g., the SPM 13) stops spinning, the actuator 16 moves the head sliders 15 from data areas to a ramp 17. In loading, the actuator 16 leaves the ramp 17 and moves to above the magnetic disks. In some approaches, a HDD with the loading and unloading scheme configured with the ramp 17 may be applied to the contact start and stop (CSS) scheme where the heads are moved to zones provided in the inner areas of the magnetic disks 11a to 11c.

FIG. 1(b) is a perspective view depicting the structure of the HDD 1 with the top magnetic disk 11a omitted, according to one embodiment. FIG. 1(b) shows the second magnetic disk 11b. The HDD 1, according to one embodiment, comprises disk damper plates. FIG. 1(b) shows a disk damper plate 18a which is disposed between the top magnetic disk 11a and the second magnetic disk 11b.

In the HDD 1, according to one embodiment, disk damper plates are disposed between magnetic disks. Since the HDD 1 has three magnetic disks 11a to 11c, disk damper plates are disposed between the first and the second magnetic disks 11a and 11b, and between the second and the third magnetic disks 11b and 11c. Airflow between magnetic disks significantly contributes to disk flutter. Hence, disk damper plates 18a and 18b (for 18b, refer to FIG. 5) disposed between magnetic disks may effectively suppress disk flutter with a smaller number of components. In this connection, other disk damper plate(s) may be disposed between a magnetic disk and the top cover and/or between a magnetic disk and the bottom of the base.

As shown in FIG. 1(b), it is preferable that the disk damper plate 18a be disposed upstream of the actuator 16. This arrangement may reduce the airflow to the actuator 16 to suppress vibrations of the actuator 16. In the HDD 1, the two disk damper plates 18a and 18b are disposed at the same location when viewed in a direction parallel to the spindle axis (the direction normal to the main planes of the magnetic disks), according to one embodiment. Accordingly, the lower disk damper plate 18b (not shown in FIG. 1(b)) is also disposed upstream of the actuator 16.

The disk damper plate 18a is provided between the main planes (recording surfaces) of the magnetic disks and comprises a plate 181a facing the main planes of the magnetic disks and two tabs 182a and 183a provided on the outer edge of the plate 181a. Screw holes are provided in the two tabs 182a and 183a and screws penetrating through the holes fix the tabs 182a and 183a, namely the disk damper plate 18a, to the inside of the base 12.

Figure 2:
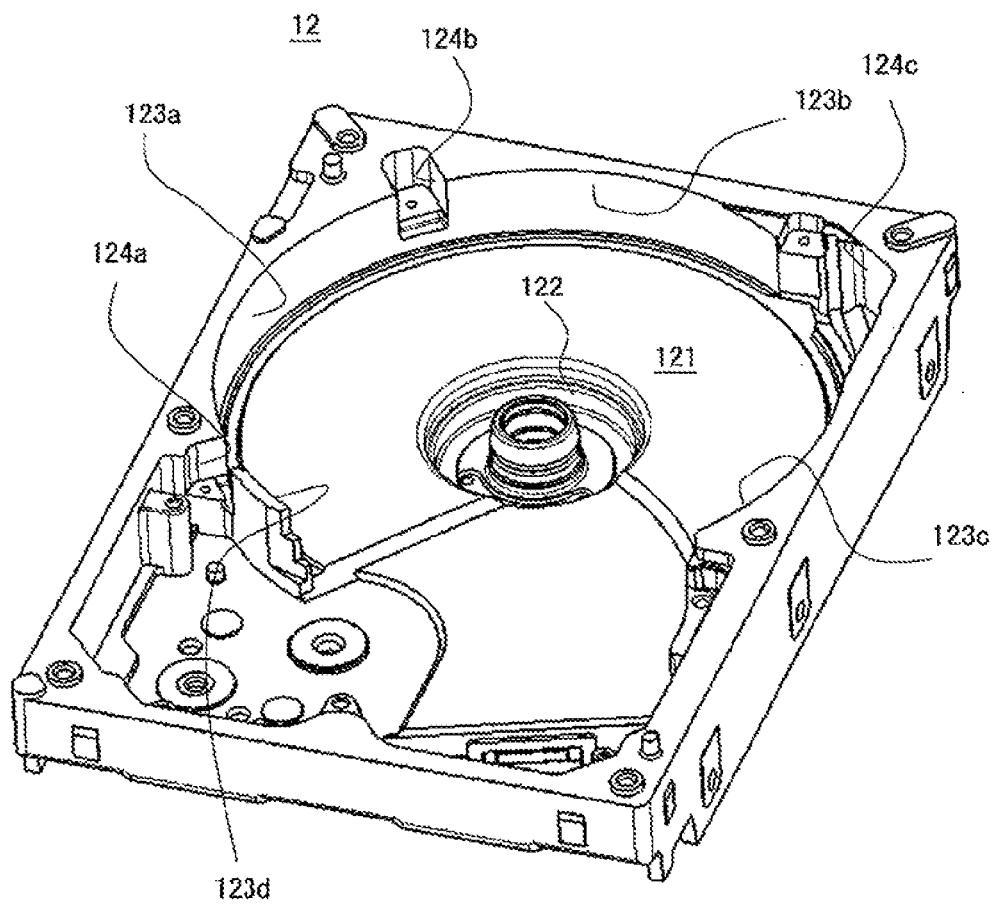
FIG. 2 is an exemplary perspective view depicting the internal structure of a base according to one embodiment.

As shown in FIG. 1(b), a part of the inside sidewall of the base 12 is formed in an arc along the outer edges of the magnetic disks. FIG. 2 is a perspective view depicting the inside structure of the base 12. In a hole 122 at the center of the bottom 121, the SPM 13 is fixed. The base 12 has a plurality of shrouds (sidewall sections) 123a to 123d which stand vertical from the bottom 121 and have arc forms along the outer edges of the magnetic disks, on its inside sidewall. The shrouds 123a to 123c are formed on the thickened part of the base 12 and the shroud 123d is an inner surface of a thin panel standing from the bottom 121.

The shroud 123a is provided between the recesses 124a and 124b in which the tabs of the disk damper plates 18a and 18b are fitted. The recesses 124a and 124b are formed in the inside wall of the base 12. The shroud 123b is provided between the recess 124b and the recess 124c in which an air filter is placed. The shroud 123c is provided between the recess 124c and the space where the actuator 16 is placed. Finally, the shroud 123d is provided between the space where the actuator is placed and the recess 124a.

The shrouds 123a to 123d have similar arc forms to the outer edges of the magnetic disks and the gaps therebetween are substantially uniform. The shrouds 123a to 124d provided around the magnetic disks 11a to 11c reduce the gaps between the outer edges of the magnetic disks 11a to 11c and the shrouds 123a to 123d, which may reduce the disk flutter caused by airflow.

Figure 3:
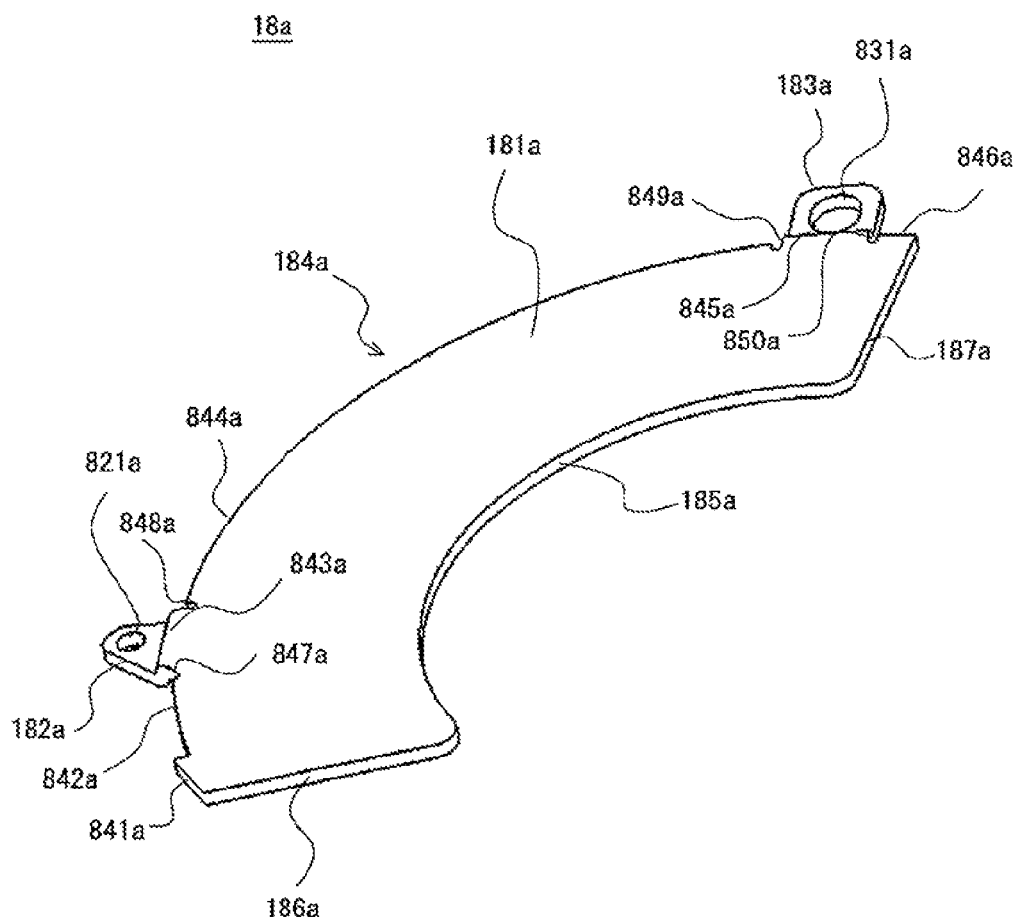
FIG. 3 is a perspective view depicting the form of a disk damper plate according to one embodiment.

FIG. 3 is a perspective view depicting a preferable form of the disk damper plate 18a, according to one embodiment. FIG. 3 is a perspective view of the disk damper plate 18a when viewed from an upper side (a top cover side). The plate part 181a is a fan-shape having an arc-shaped outer edge 184a and an inner edge 185a. From the outer edge 184a, two tabs 182a and 183a protrude. The tabs 182a and 183a have screw holes 821a and 831a, respectively. Screws penetrating the screw holes 821a and 831a secure the disk damper plate 18a to the base 12.

In a preferred example, the disk damper plate 18a is made of metal such as aluminum or resin. The widths (the dimensions in the disk radial direction) of the disk damper plates 18a and 18b are large and the gaps between the disk damper plates 18a and 18b and the magnetic disks 11a to 11c are very small, so it is necessary to prevent the disk damper plates 18a and 18b from contacting the magnetic disks 11a to 11c owing to vibrations of the disk damper plates 18a and 18b caused by an external impact.

It is preferable that the disk damper plates 18a and 18b be manufactured by sheet metal working. The sheet metal working punches a part having the form of the disk damper plate 18a from a metal plate and then bends a specified part thereof by press work. In the structure shown in FIG. 3, the bases of the tabs 182a and 183a are bent. The sheet metal working makes great effects on manufacturing efficiency and cost reduction.

If the width (the dimension between the outer edge 184a and the inner edge 185a) of the plate part 181a is uniform, the disk flutter suppression effect is strong. In other words, the arc-shaped outer edge 184a and the inner edge 185a have the same center of curvature and the outflow end 186a and the inflow end 187a are orthogonal to the outer edge 184a and the inner edge 185a. When the disk damper plates 18a and 18b are fixed to the base 12, the center of curvature thereof is the same as the rotational center of the magnetic disks 11a to 11c. The inner edge 185a, the outflow end 186a, and the inflow end 187a may have other forms.

In a preferred structural example shown in FIG. 3, according to one embodiment, the outer edge 184a may be divided into six sections 841a to 846a from the inflow end. On the sections 843a and 845a, the tabs 182a and 183a, respectively, are protruding outward. On the both sides of the sections 843a and 845a, grooves 847a and 848a, and grooves 849a and 850a, respectively, are formed. These grooves are provided so as to make the bending work on the tabs 182a and 183a easier. The section 844a is located between the tabs 182a and 183a and forms an arc having a single curvature radius. The sections 842a and 846a also have the same curvature radius and center of curvature as the section 844a. The section 841a is protruding outward from the other sections.

Figure 4:
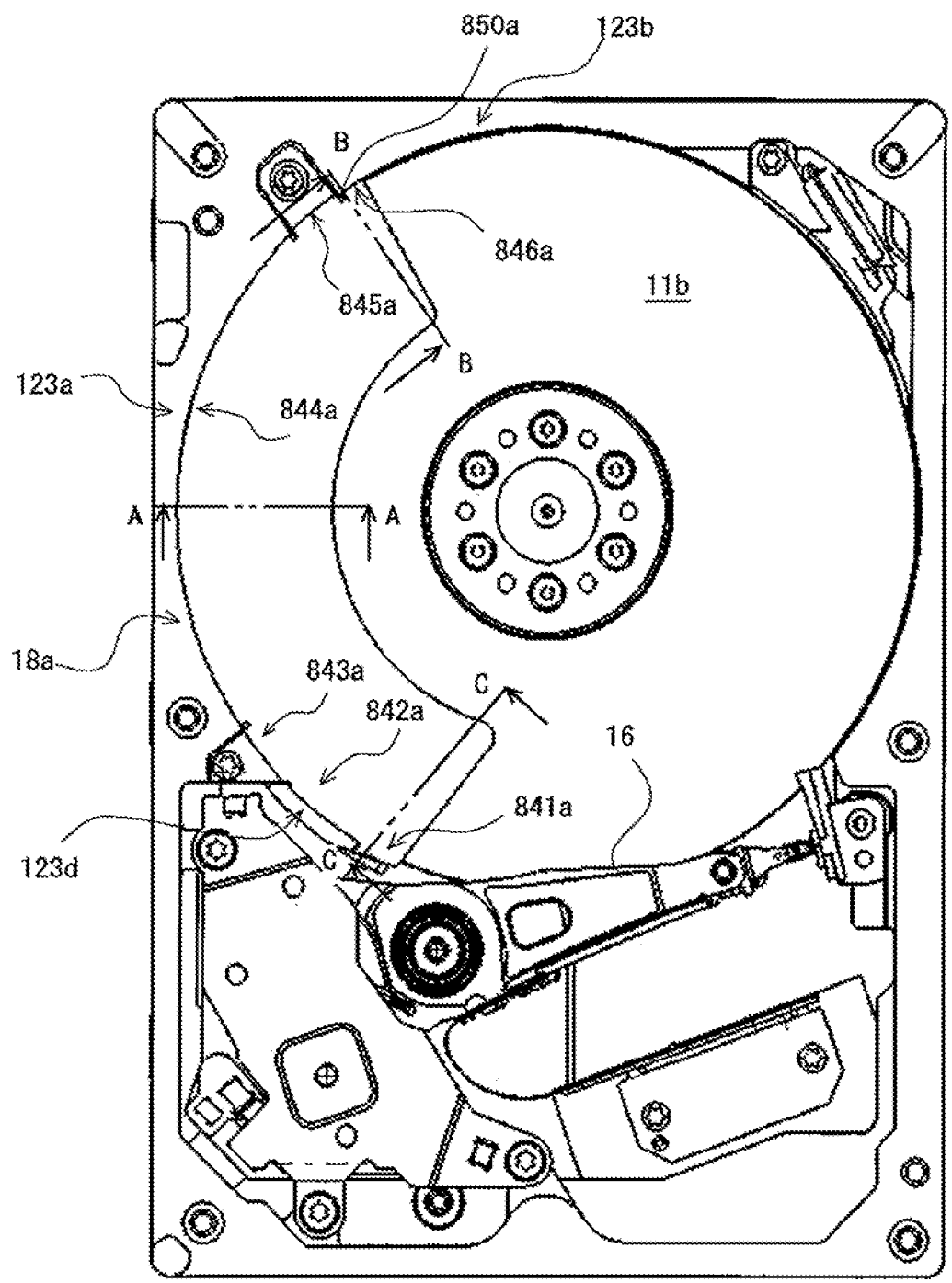
FIG. 4 is an exemplary top view depicting the structure of the HDD with the top magnetic disk omitted in one embodiment.

In the disk damper plates 18a and 18b in some embodiments, the relationship between the outer edges 184 and the inside sidewall sections 123a, 123b, and 123d of the base 12 is important. FIG. 4 is a top view showing the structure of the HDD 1 with the top magnetic disk 11a omitted and shows a disk damper plate 18a. The section 846a on the outer edge 184a is opposite to the inside sidewall section 123b of the base. The section 844a is opposite to the inside sidewall section 123a of the base. The section 842a is opposite to the inside sidewall section 123d of the base. The section 841a is not opposite to the wall of the base 12 but opposite to the actuator 16.

FIG. 5(a) is a cross-sectional view schematically showing the cross-section along the A-A section line in FIG. 4, and shows the first magnetic disk 11a, according to one embodiment. As shown in FIG. 5(a), there are gaps G1 between the outer edges of the magnetic disks 11a to 11c and the sidewall section 123a inside the base. In contrast, the outer edges 844a and 844b of the disk damper plates 18a and 18b are in contact with the sidewall section 123a.

The outer edges 844a and 844b are in contact with the sidewall section 123a along their entireties in the peripheral direction. In this way, the outer edges of the disk damper plates 18a and 18b are in contact with the sidewall sections inside the base to restrict the air flowing upward or downward between the outer edges of the magnetic disks 11a to 11c and the sidewall sections inside the base, so that the disk flutter may be effectively reduced.

FIG. 5(b) is a cross-sectional view schematically showing the cross-section along the B-B section line in FIG. 4, and shows the first magnetic disk 11a, according to one embodiment. FIG. 5(b) is a cross-section at the grooves 850a and 850b on the outer edges of the disk damper plates 18a and 18b. At the grooves, the gaps G2 between the outer edges of the disk damper plates 18a and 18b and the sidewall section 123a are larger than the gaps G1 between the outer edges of the magnetic disks 11a to 11c and the sidewall section 123a inside the base.

FIG. 5(c) is a cross-sectional view schematically showing the cross-section along the C-C section line in FIG. 4, and shows the first magnetic disk 11a, according to one embodiment. The sections 841a and 841b on the outer edges of the disk damper plates 18a and 18b are protruding outward from the magnetic disks 11a to 11c. There is no sidewall section inside the base 12 opposite to the sections 841a and 841b.

The sections 842a and 842b on the outer edges of the disk damper plates 18a and 18b are in contact with the sidewall section 123d inside the base 12. The sections 846a and 846b are in contact with the sidewall section 123b inside the base 12. Accordingly, the cross-sectional views at those sections have the same structure as the one shown in FIG. 5(a). The sections 842a, 842b, 846a, and 846b are in contact with the sidewall sections along their entireties in the peripheral direction. These sections 842a, 842b, 846a, and 846b restrict air flowing upward or downward between the outer edges of the magnetic disks 11a to 11c and the sidewall sections inside the base, so that the disk flutter may be effectively reduced.

As explained with reference to FIGS. 4 and 5(a) to 5(c), on the outer edge of the disk damper plate 18a, the sections 842a, 844a, and 846a have the forms along the opposite sidewall sections 123a, 123b, and 123d, respectively, in the peripheral direction, according to one embodiment. This is the same in the disk damper plate 18b. The sidewall sections 123a, 123b, and 123d have the forms along the outer edges of the magnetic disks and the gaps G1 therebetween are substantially uniform.

To restrict the air flowing upward or downward between the magnetic disks 11a to 11c and the sidewall sections inside the base, it is preferable that the sections 842a, 842b, 844a, 844b, 846a, and 846b having the forms along the sidewall sections inside the base be in contact with the sidewall sections 123d, 123a, and 123b. If the gaps therebetween are smaller than the gaps between the outer edges of the magnetic disks and the sidewall sections 123d, 123a, and 123b, the airflow may be restricted.

Figure 6:
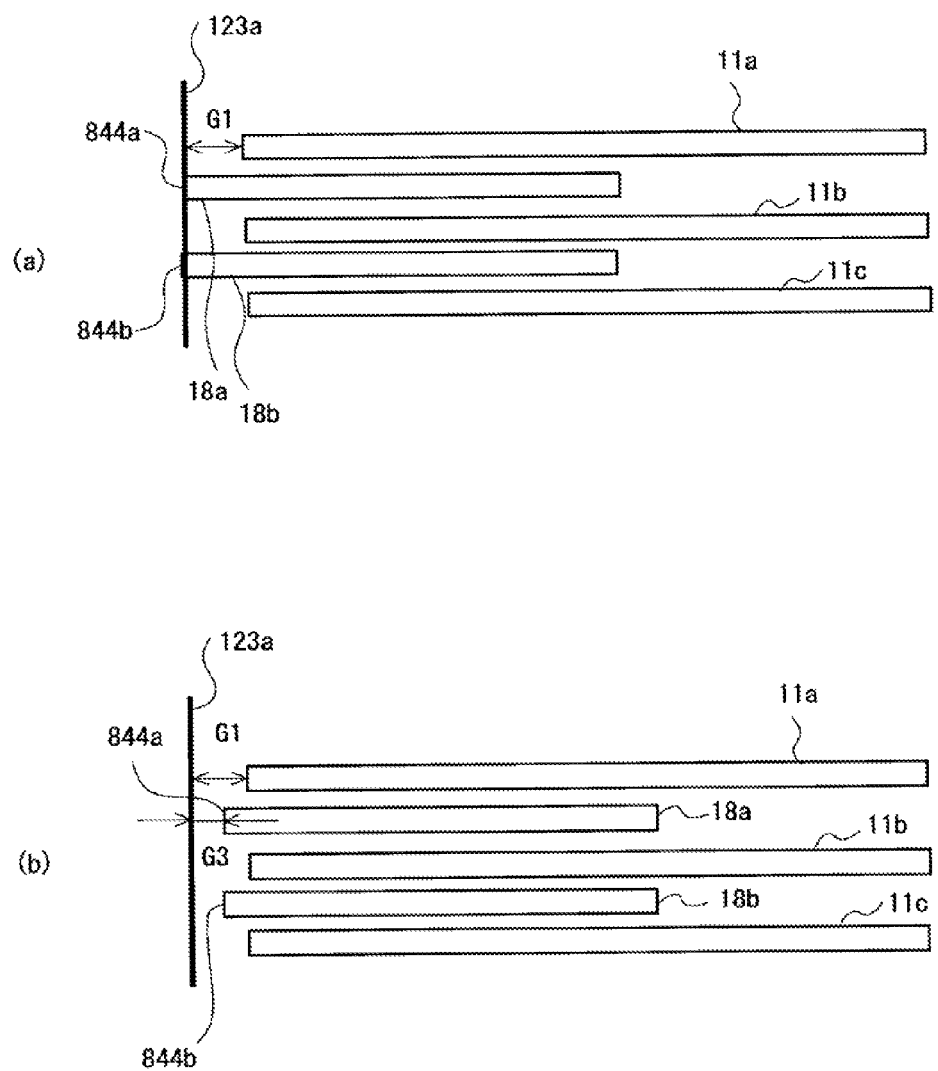
FIGS. 6(a)-6(b) are exemplary drawings schematically illustrating an example in which gaps G3 exist between the outer edges of the disk damper plates and the sidewall sections in several embodiments.

FIG. 6(b) schematically illustrates an example in which gaps G3 are present between the sections 844a and 844b on the outer edges of the disk damper plates 18a and 18b and the sidewall section 123a, according to one embodiment. FIG. 6(a) shows the preferred structural example in FIG. 5(a) for comparison. The sections 844a and 844b are located outside the outer edges of the magnetic disks 11a to 11c and closer to the sidewall section 123a. Accordingly, the gaps G3 are smaller than the gaps G1. FIG. 6(b) shows the sections 844a and 844b on the outer edges of the disk damper plates 18a and 18b, but the sections 842a, 842b, 846a, and 846b have the same structure.

Hereinafter, the disk damper plate 18a will be explained, but the disk damper plate 18b may be substantially the same. Like the grooves 847a to 850a, the parts which face the sidewall sections inside the base but do not have forms along the sidewall sections may have greater gaps to the sidewall sections than the gaps between the magnetic disks and the sidewall sections. On the outer edge 184a of the disk damper plate, however, it is preferable that the sections 842a, 844a, and 846a which have the forms along the sidewall sections 123d, 123a, and 123b having the forms along the outer edges of the magnetic disks be located closer to the sidewall sections than the outer edges of the magnetic disks along the entireties in the peripheral direction.

In this structure, it is preferable that the sections 842a, 844a, and 846a be in contact with the sidewall sections 123d, 123a, and 123b, respectively, as shown in FIG. 5(a), according to one embodiment, but all or a part of them may be distant from the sidewall sections 123d, 123a, and 123b. Considering the manufacturing tolerance, it is common that there are parts having slight gaps. In such a case, however, the gaps are smaller than the gaps between the magnetic disks 11a to 11c and the sidewall sections 123d, 123a, and 123b.

To restrict the air flowing upward or downward, it is preferable that the sections 842a, 844a, and 846a be in contact with the sidewall sections 123d, 123a, and 123b, respectively, or have smaller gaps to the sidewall sections than the gaps between the outer edges of the magnetic disks and the sidewall sections along the entireties in the peripheral direction. However, if a part of the sections 842a, 844a, and 846a protrude outside the outer edges of the magnetic disks, there is the effect to restrict the air flowing upward or downward.

To exert an effect to actually suppress disk flutter by restricting upward or downward airflow with the disk damper plate 18a, however, it is preferable that more than a half of the outer edge of the disk damper plate 18a opposite to the sidewall sections inside the base satisfy the above-described condition. On the outer edge 184a of the disk damper plate, the parts opposite to the sidewall sections are the parts except for the sections 841a, 843a, and 845a. The section 841a is opposite to the actuator 16, and on the sections 843a and 845a, tabs 182a and 182 are provided. The grooves 847a to 850a do not have forms along the sidewall sections but they are included in the parts opposite to the sidewall sections.

To reduce the gap between the outer edge 184a of the disk damper plate 18a and the sidewall sections inside the base, it is preferable that a structure to press the outer edge 184a against the sidewall sections inside the base be provided. The disk damper plate 18a is secured to the base at the tabs 182a and 183a. Hence, it is preferable that the securing sections have such press structures.

Figure 7:
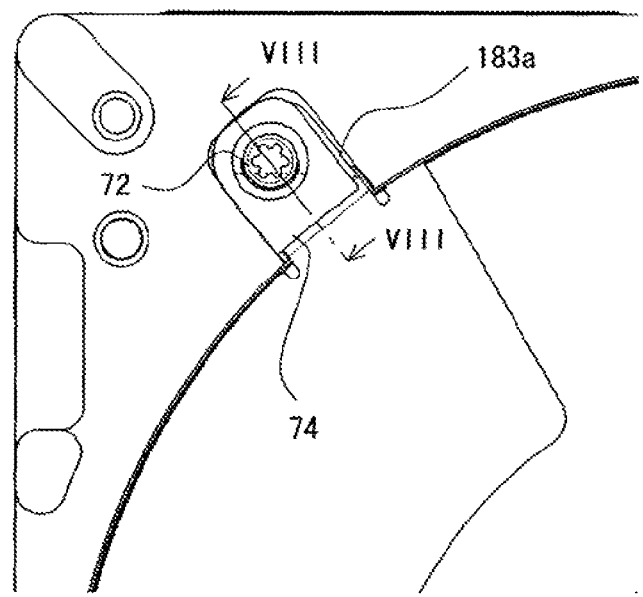
FIGS. 7(a)-7(b) are an exemplary plan views depicting the structure of the securing sections of the disk damper plates in several embodiments.
Figure 7:
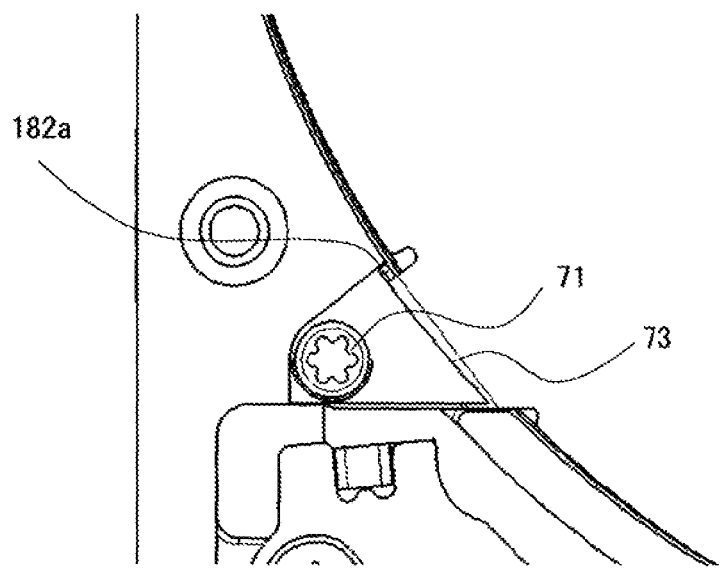

FIG. 7(a) is a top view illustrating the tab 183a secured to the base 12, and FIG. 7(b) is a top view of the tab 182a secured to the base 12. The tab 183a is secured with a screw 72 inserted in a direction from the magnetic disks toward the spindle motor, namely from an upper side. The tab 182a is secured with a screw 71 inserted from an upper side. Between the tab 183a and the screw 72, and between the tab 182a and the screw 71, spacers 74 and 73 are interposed, respectively.

Figure 8:
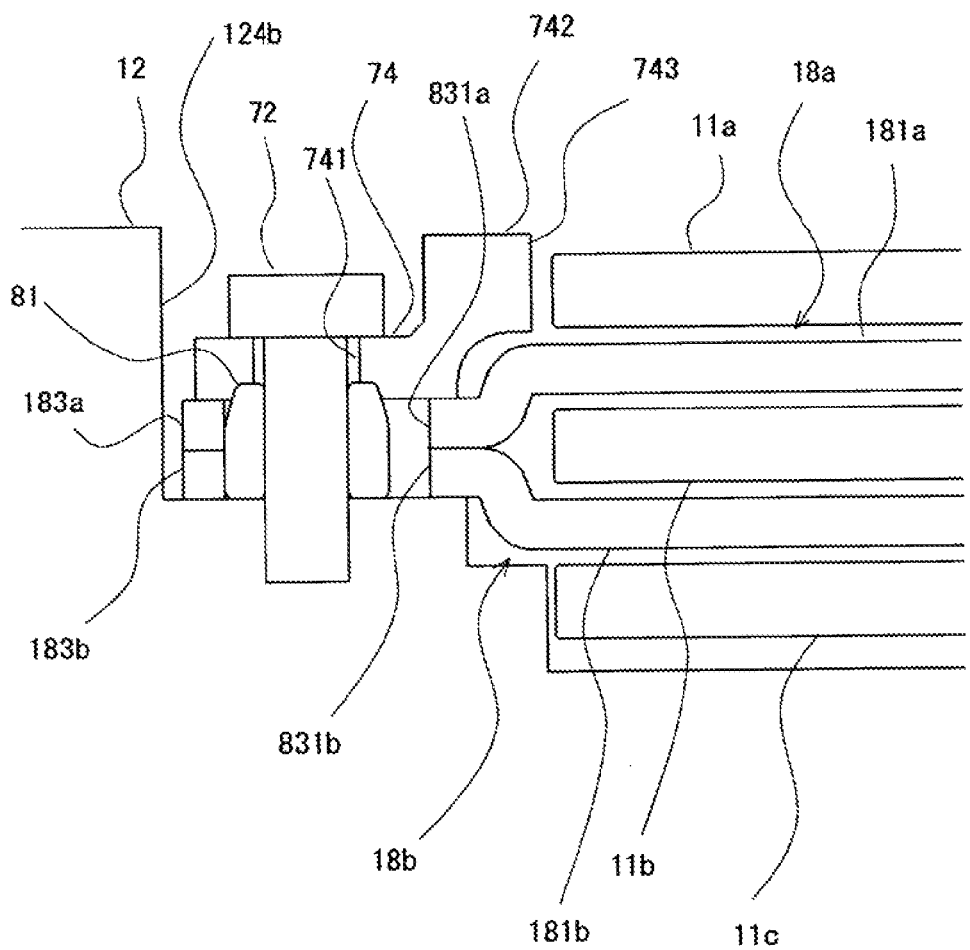
FIG. 8 is an exemplary cross-sectional view depicting the structure of the securing section of the disk damper plates in one embodiment.

FIG. 8 is a cross-sectional view schematically illustrating the cross-section along the VIII-VIII section line in FIG. 7(a), according to one embodiment. The tab 183a of the disk, damper plate 18a and the tab 183b of the disk damper plate 18b are stacked and secured together. The tabs 183a and 183b are secured in the recess 124b in the base 12. The screw 72 is fixed to the bottom of the recess 124b through the holes 831a and 831b in the tabs 183a and 183b. To secure the tabs 183a and 183b together in stack, the tab 183a is bent so as to locate lower than the plate 181a and the tab 183b is bent so as to locate upper than the plate 181b. A spacer may be interposed between the tabs 183a and 183b.

Between the tab 183a and the head of the screw 72, a spacer 74 is interposed. The screw 72 penetrates the hole 741 in the spacer 74 to press the tabs 183a and 183b against the base via a spacer. The spacer 74 has a shroud 742 extending toward the outer edge of the top magnetic disk 11a. The shroud 742 has an inner edge 743 which is opposite to the outer edge of the magnetic disk 11a and has a form along the outer edge of the disk. The shroud 742 of the spacer 74 may reduce the flutter of the magnetic disk 11a. Depending on the design, the spacer 74 may be omitted. Conversely, it is preferable that a spacer having a similar shroud be interposed between the screw 71 and the tab 182a.

For manufacturing efficiency and reducing the number of components, the screw 72 preferably secures the tabs of all of the disk damper plates to the base as illustrated in FIG. 8, according to one embodiment. Gathering the tabs of the disk damper plates at a place allows reduction in the number of recesses for securing the tabs. The existence of the recesses allows reduction of the sidewall sections opposite to and along the outer edges of the magnetic disk, so the present structure may suppress increase of disk flutter.

In FIG. 8, in the through holes 831a and 831b in the tabs 183a and 183b, a resin component 81 is provided. The resin component 81 is in contact with the inside surfaces on the outer side (the far side from the magnetic disks) of the through holes 831a and 831b, but distant from the inside surfaces on the inner side (the close side to the magnetic disks) thereof. The resin component 81 is flattened out by the screw 72 to press the tabs 183a and 183b toward the outer side. In other words, the resin component 81 functions as a mechanism to move the disk damper plates 18a and 18b in the direction away from the magnetic disks 11a to 11c and press the outer edges of the disk damper plates 18a and 18b against the sidewall sections inside the base 12.

Figure 9:
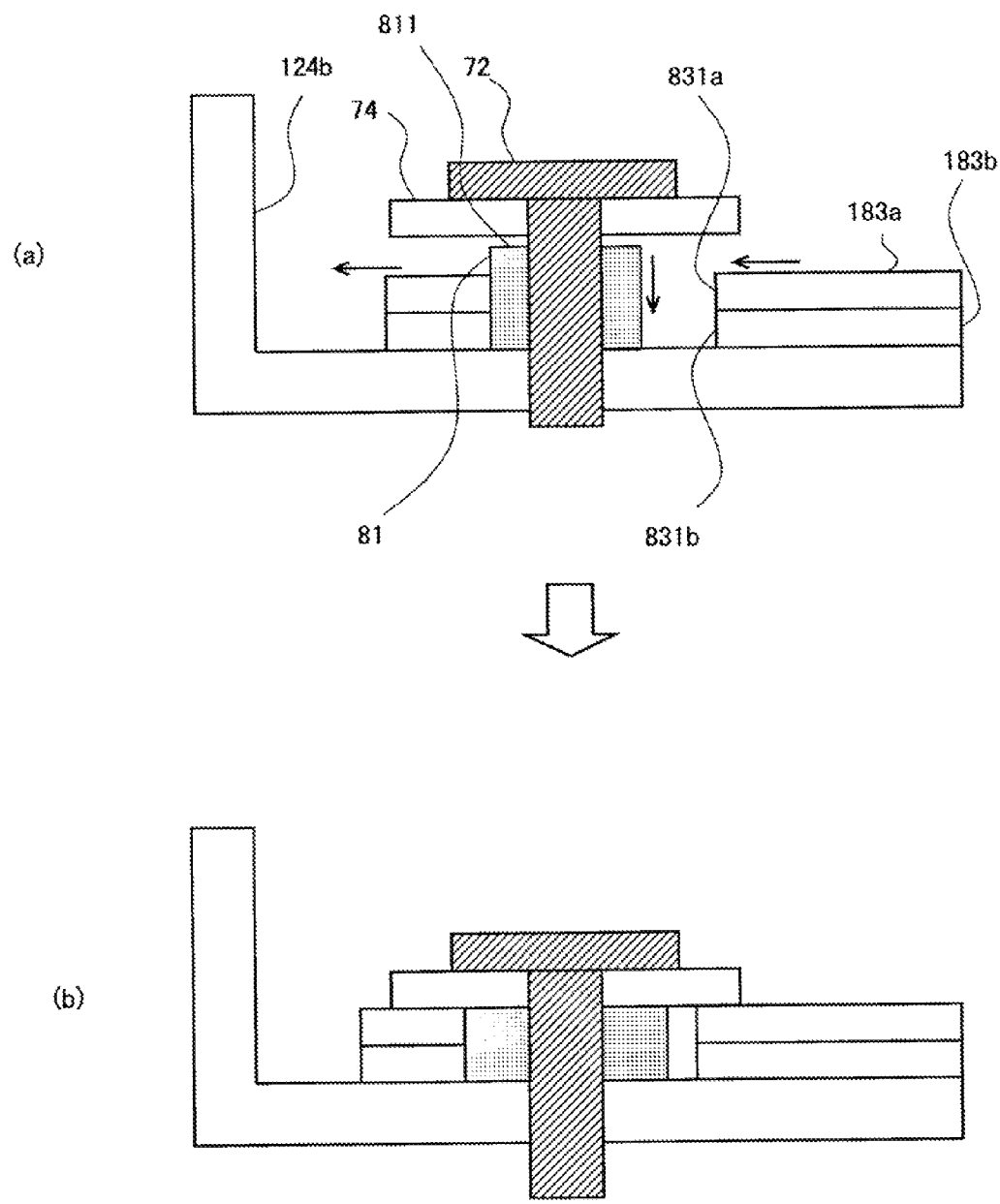
FIGS. 9(a)-9(b) are exemplary drawings schematically illustrating the actions of a resin component at the securing section of the disk damper plates in several embodiments.

FIGS. 9(a) and 9(b) are drawings schematically illustrating the actions of the resin component 81, according to several embodiments. As shown in FIG. 9(a), the screw 72 is inserted in the screw hole of the base 12. The resin component 81 is distant from the inside surfaces on the inner side of the though holes 831a and 831b (the inside surfaces on the right side of FIG. 9(a)). In the example in the figure, the resin component 81 is in contact with the inside surfaces on the outer side of the though holes 831a and 831b. The resin component 81 may be distant from the inside surfaces on the outer side of the through holes 831a and 831b before getting pressed by the screw 72. The top face 811 of the resin component 81 is located upper than the top face of the tab 183a and protruding upward from the through hole 831a.

As the screw 72 enters the screw hole deeply, the underside of the spacer 74 gets in contact with the top face 811 of the resin component 81 and presses it downward so as to flatten out the resin component 81. As shown in FIG. 9(b), according to one embodiment, when the resin component 81 is pressed in an upward-and-downward direction, it extends leftward and rightward by elastic deformation. The resin component 81 pushes the inside surfaces on the outer side of the through holes 831a and 831b, whereby the tabs 183a and 183b, or the disk damper plates 18a and 18b, moves outward. By this movement, at least a part of the outer edges of the disk damper plates 18a and 18b gets in contact with and is pressed against the sidewall sections inside the base 12.

Even if the tabs 183a and 183b have moved rightward, the inside surfaces on the inner side of the through holes 831a and 831b are distant from the resin component 81. The screw 72 is tightened with the spacer 74 being in contact with the top face of the tab 183a. When the screw 72 has been fully inserted, the inside surfaces on the inner side of the through holes 831a and 831b is preferably distant from the resin component 81. This is because that the outer edges of the disk damper plates 18a and 18b may be pressed more closely against the sidewall sections inside the base 12. Depending on the design, the inside surfaces on the inner side of the through holes 831a and 831b may be in contact with the resin component 81 when the screw 72 has been finally tightened. The spacer is not necessarily in contact with the top face of the tab 183a.

In this way, the resin component 81 elastically presses the outer edges of the disk damper plates 18a ad 18b against the sidewall sections inside the base 12. Since the resin component 81 is flattened out to be deformed, the preferable material for it is rubber. For accurate positioning, it is preferable that the resin component 81 be ring-shaped and that the screw 72 penetrate the hole thereof. However, as long as the tabs 183a and 183b may be pushed outward, the resin component 81 is not necessarily ring-shaped.

Instead of the resin component 81, other elastic components may be used. For example, a tube-shaped metal component may be used as the elastic component. When the tube-shaped metal component is pushed by the head of the screw 72 (the spacer 74), it is elastically deformed to extend leftward and rightward. This is the same motion as the resin component 81; it pushes the tabs 183a and 183b toward the outer side and presses the disk damper plates 18a and 18b against the sidewall sections inside the base 12. It is the same as the resin component 81 that the tube-shaped metal component is preferably ring-shaped for accurate positioning. The resin component 81 may be made of a plastically deformable material such as resin or other materials, but elastically deformable component is preferable for a rework process.

As described with reference to FIG. 6(b), the resin component 81 is useful in the structure in which the outer edge 184a (the outer edge of the disk damper plate 18b is not shown) of the disk damper plates 18a and 18b is distant from the sidewall sections inside the base 12. The flattened out resin component 81 brings the outer edges of the disk damper plates 18a and 18b closer to the sidewall sections inside the base. This movement reduces the gaps G3 between the outer edges of the disk damper plates 18a and 18b and the sidewall sections inside the base and brings the outer edges of the disk damper plates 18a and 18b closer to the sidewall sections than the outer edges of the magnetic disks 11a to 11c.

As shown in FIGS. 7(a) and 7(b), the disk damper plates 18a and 18b are secured to the base 12 at two points each, according to one embodiment. The above explanation is about the securing section of the tabs 183a and 183b. In the securing section of the tabs 182a and 182b, the resin component 81 is not necessary. The use of the resin component 81 at either one of the two securing sections accomplishes reduction in the number of components.

Figure 10:
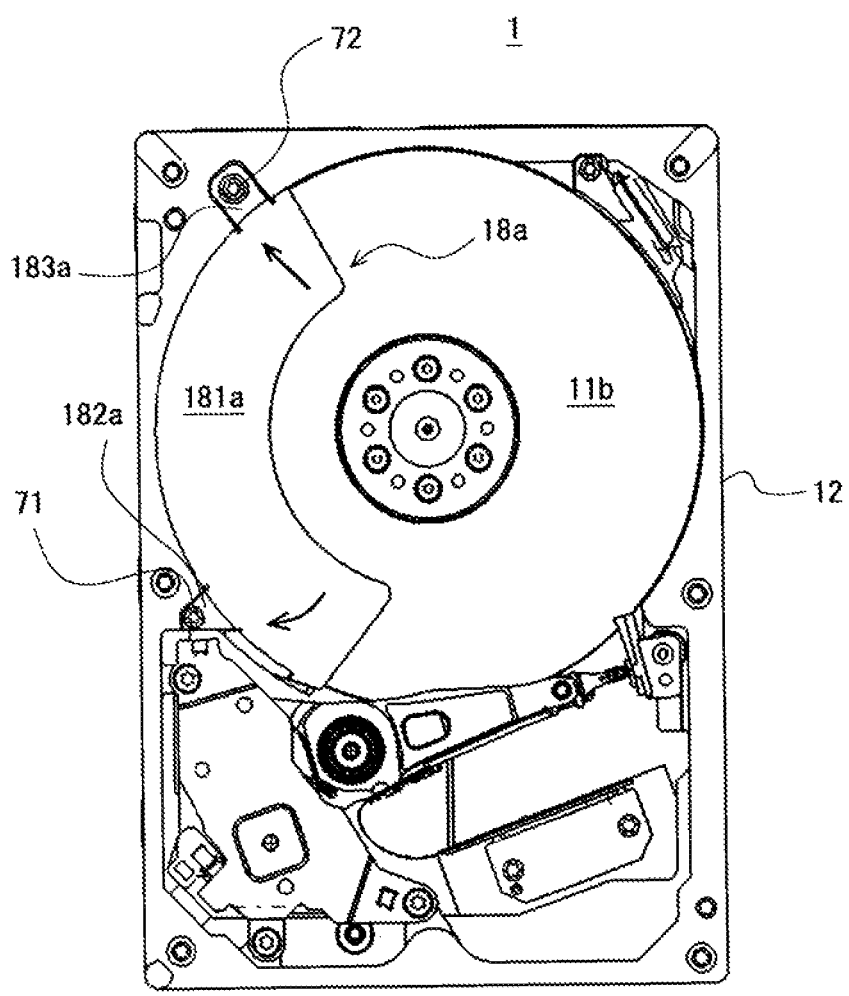
FIG. 10 is an exemplary drawing illustrating the method of securing the disk damper plates in the assembling step in the manufacture of a HDD in one embodiment.

Hereinafter, a securing method of the disk damper plates 18a and 18b in the assembling step of a HDD 1 will be described with reference to FIG. 10. First, the method places the lowermost magnetic disk 11c on the hub of the SPM 13 fixed in the hole 122 of the base 12. Next, it places the disk damper plate 18b above the magnetic disk 11c inside the base 12. The disk damper plate 18b is distant from the main plane of the magnetic disk 11c and the tabs 182a and 183b are in the recesses 124a and 124b, respectively. Then, the method places the second magnetic disk 11b on the hub of the SPM 13 so as to be stacked above the magnetic disk 11c. The main plane of the magnetic disk 11b is distant from the disk damper plate 18b. Subsequently, the method places the disk damper plate 18a above the magnetic disk 11b inside the base 12. The disk damper plate 18a is distant from the main plane of the magnetic disk 11b and the tabs 182a and 183b are in the recesses 124a and 124b, respectively.

After having placed the two disk damper plates 18a and 18b inside the base 12, the method fasten the screws 71 and 72 to the base 12. The screw 71 at the downstream and the screw 72 at the upstream are right-hand screws and the screws' tightening direction is reverse to the rotational direction of the SPM in one example. First, it temporarily tightens the screws 71 and 72. Spacers are interposed between the screw 71 and the tab 182a, and between the screw 72 and the tab 183a. Then, it finally tightens the screw 72 on the right side as viewed from the spindle shaft. At this time, as shown in FIG. 10, the both of the inflow ends and outflow ends of the disk damper plates 18a and 18b move toward the sidewall of the base.

The movement of the inflow end (the end at the upstream) has been already explained with reference to FIGS. 9(a) and 9(b). With the action of the resin component 81, the tabs 183a and 183b are pushed toward the outer side so that the inflow end also moves outward. In final tightening of the right-hand screw 72, the disk damper plates 18a and 18b turn clockwise around the screw 72 when viewed from an upper side. Thereby, the outflow end (the end at the downstream) moves outward. These two movements allow the entire disk damper plates 18a and 18b to shift outward. To ensure the movement, it is preferable that the screw 72 and the tabs 183a and 183b be located on the right side of the center of the disk damper plates 18a and 18b, when viewed from the rotational axis of the SPM 13 with the top cover defined as the top.

The method finally tightens the screw 71 after the final tightening of the screw 72 to closely secure the disk damper plates 18a and 18b to the base 12. Then, the method places the top magnetic disk 11a to the SPM 13 and secures a clamp 14 to the SPM 13. Thereby, the three magnetic disks 11a to 11c are fixed to the SPM 13. The assembling of the HDDI then fixes other component such as the actuator 16 with the VCM 19 and the head 15 secured, inside the base 12 and covers the opening of the base 12 with a top cover. Now, the head disk assembly (HDA) is finished. Thereafter, the HDA is subjected to a servo write step and a test step, and then is finalized into the HDD 1 with a control circuit board mounted.

As described above, in securing the disk damper plates 18a and 18b, it is sufficient that the resin component 81 be provided in one of the two securing sections, but may be provided in the both of them. In the case that the resin component is provided in either part, if the screw is a right-hand screw, the resin component is attached to the right securing section when viewed from the spindle shaft, and if the screw is a left-hand screw, the resin component is attached to the left securing section, then the resin component is finally fastened with the screw. Thereby, as explained with reference to FIG. 10, the entire disk damper plates 18a and 18b may be shifted outward.

As described above, an elastic component included in a screwing section of the disk damper plates 18a and 18b allows the disk damper plates 18a and 18b to shift outward easily and efficiently in assembling the disk damper plates 18a and 18b. As understood from the above explanation, to press the disk damper plates 18a and 18b against the sidewall sections evenly, it is necessary that the angle of the disk damper plates 18a and 18b in the peripheral direction (the angle of the arcs of the outer edges of the disk damper plates 18a and 18b) be 180° or less.

Accordingly, a single disk damper plate is capable of covering up to only a half of the main plane of a magnetic disk, according to one embodiment. However, like the HDD 1 in one embodiment, reducing the gap between the disk damper plates and the sidewall sections inside the base for restricting upward or downward airflow allows efficient suppression of disk flutter even with the disk damper plates having small areas. Alternatively, two disk damper plates may be provided at the same height in the HDD 1, whereby the area to be covered by the disk damper plates may be increased. In this structure, it is preferable that each disk damper plate has the same structure as the above-described disk damper plates 18a and 18b.

The above description is to explain one preferred embodiment, and the present invention is not limited to the above embodiment alone. A person skilled in the art may easily modify, add, or convert the components in the above embodiment within the scope of the present invention. For example, the present invention may be applied to a disk drive having a disk other than a magnetic disk. Preferably, the sidewall sections inside the base opposite to the outer edge of the magnetic disk be formed by working on a part of the base to reduce the number of components, but it may be configured by attaching components made of resin, for example, to the inside of the base. The disk damper preferably has a plurality of tabs, but it may be configured with a single tab. The mechanism for pressing the disk damper outward is preferably an elastic component, but it may have a configuration other than that.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:
1. A disk drive, comprising:
a base;
a spindle motor coupled to the bottom of the base;
a disk coupled to and rotated by a rotational shaft of the spindle motor;
an airflow reduction plate coupled inside the base and positioned opposite to and away from a main plane of the disk; and
a sidewall section inside the base which is positioned opposite to an outer edge of the disk and has a form along the outer edge of the disk,
wherein a first gap between at least one half of a part positioned opposite to the sidewall section in an outer edge of the airflow reduction plate and the sidewall section is smaller than a second gap between the sidewall section and the outer edge of the disk;
a mechanism for pushing the airflow reduction plate toward the sidewall section in a direction about perpendicular to and away from a rotational axis of the spindle motor; and
a screw penetrating a hole in a tab formed on the outer edge of the airflow reduction plate in a direction normal to a main plane of the airflow reduction plate, wherein the screw is fastened to a screw hole located beyond an outer dimension of the sidewall section inside the base,
wherein the mechanism further includes an elastic component for pressing the airflow reduction plate against the sidewall section which pushes the tab between the screw and the hole in the tab.

2. The disk drive according to claim 1, wherein at least a portion of the part positioned opposite to the sidewall section in the outer edge of the airflow reduction plate contacts the sidewall section.

3. The disk drive according to claim 2, further comprising a mechanism for pressing the part positioned opposite to the sidewall section in an outer edge of the airflow reduction plate against the sidewall section.

4. The disk drive according to claim 1, wherein the elastic component is elastically deformed by being flattened out in a direction normal to a direction in which the tab is being pushed by the screw.

5. The disk drive according to claim 1, further comprising:
a second screw being a right-hand screw which penetrates a hole in a second tab formed on a right side of the tab when viewed from the rotational shaft of the spindle motor on the outer edge of the airflow reduction plate in a direction normal to the main plane of the airflow reduction plate, wherein the second screw is inserted in and fastened to a second screw hole located beyond an outer dimension of the sidewall section inside the base in a direction from the disk toward the spindle motor, wherein the mechanism is positioned between the hole in the second tab of the screw and the second screw, and wherein the mechanism includes the elastic component to press the airflow reduction plate against the sidewall section which pushes the second tab via flattening out in a direction normal to a main axis of the second screw.

6. The disk drive according to claim 1, wherein the first gap between all of the part positioned opposite to the sidewall section in the outer edge of the airflow reduction plate and the sidewall section is smaller than the second gap between the sidewall section and the outer edge of the disk.

7. A method for manufacturing a disk drive as recited in claim 1, the method comprising:

preparing the base having the spindle motor coupled to the bottom thereof;

placing the disk on the shaft of the spindle motor;

arranging the sidewall section inside the base having the form along the outer edge of the disk so as to be opposite to the outer edge of the disk;

placing the airflow reduction plate having the part and the tab on the outer edge of the airflow reduction plate inside the base so that the part is located opposite to the main plane of the disk and the tab is located beyond the outer dimension of the sidewall section;

inserting the screw into the hole in the tab in the direction normal to the main plane of the airflow reduction plate from the disk toward the spindle motor; and flattening out the elastic component by tightening the screw fastened to the screw hole in the base.

8. The method of manufacturing a disk drive according to claim 7, wherein the flattening out the elastic component interposed between the screw and the hole in the tab pushes the tab outward, thereby pressing the outer edge of the airflow control plate against the sidewall section.

9. The method of manufacturing a disk drive according to claim 7, wherein the airflow reduction plate includes the tab and a second tab on the outer edge of the part, and the second tab is located on a right side of the airflow reduction plate when viewed from the rotational axis of the spindle motor, and the method further comprising:

flattening out a component interposed between a second screw being a right-hand screw and a hole in the second tab pushing the second tab outward for moving the outer edge of the airflow reduction plate toward the sidewall section by tightening the second screw, which is inserted in the hole in the second tab and fastened to a screw hole in the base, in a direction from the disk toward the spindle motor; and tightening the screw, which is inserted in the hole in the tab in a direction from the disk toward the spindle motor, fastened to the screw hole inside the base, after tightening the second screw.

10. The method of manufacturing a disk drive according to claim 7, wherein:

the airflow reduction plate includes the tab and a second tab on an outer edge of the part;

the tab is located on a left side of the airflow reduction plate when viewed from the rotational axis of the spindle motor;

the method further comprises:

flattening out the elastic component interposed between the screw being the left-hand screw and the hole in the tab to push the tab outward for moving the outer edge of the airflow reduction plate toward the sidewall section, wherein tightening the screw, which is inserted in the hole in the tab in a direction from the disk toward the spindle motor, fastens the screw to the screw hole in the base; and tightening a second screw, which is inserted in a hole in the second tab in a direction from the disk toward the spindle motor, thereby fastening the second screw to a screw hole in the base, after tightening the screw.

11. The method of manufacturing a disk drive according to claim 7, wherein the elastic component is comprises elastically deformable rubber.

12. A disk drive, a base;

a spindle motor coupled to the bottom of the base;

a disk coupled to and rotated by a rotational shaft of the spindle motor;

an airflow reduction plate coupled inside the base and positioned opposite to and away from a main plane of the disk; and a sidewall section inside the base which is positioned opposite to an outer edge of the disk and has a form along the outer edge of the disk, wherein a first gap between at least one half of a part positioned opposite to the sidewall section in an outer edge of the airflow reduction plate and the sidewall section is smaller than a second gap between the sidewall section and the outer edge of the disk;

a mechanism for pushing the airflow reduction plate toward the sidewall section in a direction about perpendicular to and away from a rotational axis of the spindle;

a first screw being a left-hand screw which penetrates a hole in a first tab formed on the outer edge of the airflow reduction plate in a direction normal to a main plane of the airflow reduction plate, wherein the first screw is inserted in and fastened to a first screw hole located beyond an outer dimension of the sidewall section inside the base in a direction from the disk toward the spindle motor; and a second screw penetrating a hole in a second tab formed on a right side of the first tab when viewed from the rotational shaft of the spindle motor on the outer edge of the airflow reduction plate in a direction normal to the main plane of the airflow reduction plate, wherein the second screw is inserted in and fastened to a second screw hole located beyond an outer dimension of the sidewall section inside the base in a direction from the disk toward the spindle motor, wherein the mechanism is positioned between the first screw and the hole in the first tab of the first screw and the second screw, and wherein the mechanism includes an elastic component to press the airflow reduction plate against the sidewall section which pushes the first tab via flattening out in a direction normal to a main axis of the first screw.

13. A disk drive, comprising:

a base;

a spindle motor coupled to a bottom of the base;

a disk coupled to and rotated by a rotational shaft of the spindle motor;

an airflow reduction plate which is coupled to an inside of the base and positioned opposite to and away from a main plane of the disk;

a sidewall section inside the base which is opposite to an outer edge of the disk and has a form along the outer edge; and a mechanism for pressing an outer edge of the airflow reduction plate against the sidewall section in a direction about perpendicular to and away from a rotational axis of the spindle;

a tab of the airflow reduction plate having a screw hole ;

a screw penetrating the screw hole in a direction normal to a main plane of the airflow reduction plate inserted and fastened to a screw hole located outside the sidewall section inside the base in a direction from the disk toward the spindle motor; and the mechanism pushes the tab outward between the screw and the hole in the tab to press the airflow reduction plate against the sidewall section, wherein the mechanism includes an elastic component which is elastically deformed by being flattened out in the normal direction by the screw to pushing the tab.

14. A disk drive, comprising:

a base;

a spindle motor coupled to a bottom of the base;

a disk coupled to and rotated by a rotational shaft of the spindle motor;

an airflow reduction plate which is coupled to an inside of the base and positioned opposite to and away from a main plane of the disk;

a sidewall section inside the base which is opposite to an outer edge of the disk and has a form along the outer edge;

a mechanism for pressing an outer edge of the airflow reduction plate against the sidewall section in a direction about perpendicular to and away from a rotational axis of the spindle;

a first screw penetrating a hole in a first tab formed on the outer edge of the airflow reduction plate in a direction normal to the main plane, and inserted in and fastened to a first screw hole located outside the sidewall section inside the base in a direction from the disk toward the spindle motor; and a second screw penetrating a hole in a second tab formed on the outer edge of the airflow reduction plate in a direction normal to the main plane, and inserted in and fastened to a second screw hole positioned beyond an outer dimension of the sidewall section inside the base in a direction from the disk toward the spindle motor, wherein a rightward or leftward rotational direction for tightening the second screw agree with a right or left location of the second screw with respect to the first screw when viewed from the rotational shaft of the spindle motor, and wherein the mechanism pushes the second tab via flattening out in a direction normal to a main axis of the second screw to press the airflow reduction plate against the sidewall section.

* * * * *

UNITED STATES PATENT AND TRADEMARK OFFICE
CERTIFICATE OF CORRECTION

| | |
|---|---|
| PATENT NO. | : 8,570,682 B2 |
| APPLICATION NO. | : 12/642332 |
| DATED | : October 29, 2013 |
| INVENTOR(S) | : Ichikawa et al. |

It is certified that error appears in the above-identified patent and that said Letters Patent is hereby corrected as shown below:

In the specification:

col. 1, line 58 replace "(Fly)" with --(FIV)--;

col. 6, line 15 replace "shall" with --shaft--;

col. 13, line 21 replace "though" with --through--;

col. 13, line 25 replace "though" with --through--;

col. 15, line 17 replace "HDDI" with --HDD1--.

Signed and Sealed this
Twenty-eighth Day of January, 2014

Michelle K. Lee
*Deputy Director of the United States Patent and Trademark Office*